United States Patent Office 3,419,548
Patented Dec. 31, 1968

3,419,548
AMINO AZACYCLOALKANONES
Karl Gätzi, Basel, Switzerland, assignor to Geigy Chemical Corporation, Greenburgh, N.Y., a corporation of Delaware
No Drawing. Filed July 8, 1965, Ser. No. 470,623
Claims priority, application Switzerland, July 13, 1964, 9,205/64
15 Claims. (Cl. 260—239.3)

ABSTRACT OF THE DISCLOSURE 3-sec- and 3-tert-aminoazacycloalkan-2-ones having 6 to 8 ring carbon atoms and their acid salts have fungicidal activity. Compositions containing these compounds are fungicides and methods for combatting fungi involve the use of these compounds.

---

The present invention concerns new amino azacycloalkanones and their salts, processes for the production thereof as well as fungicidal agents which contain these azacycloalkanones and/or their salts as active ingredients, also processes for combatting phytopathogenic fungi using the new active ingredients and/or their salts or using agents which contain such substances as active ingredients, as well as processes for the production of these fungicidal agents.

It has been found that amino azacycloalkanones of the general Formula I

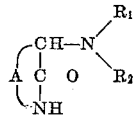

wherein $R_1$ represents an optionally substituted aliphatic, cycloaliphatic or aromatic radical,
$R_2$ represents hydrogen or a low alkyl radical,
A represents an optionally branched chained alkylene radical having 4 to 14 carbon atoms of which 4 to 6 are ring members, and their salts with inorganic and organic acids are useful for combatting fungi, particularly phytopathogenic fungi, because of their excellent activity.

The new amino azacycloalkanones of general Formula I are produced according to the invention by reacting a halogen azacycloalkanone of the general Formula II

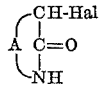   II wherein A has the meaning given in Formula I and Hal represents a halogen atom of the atomic numbers 17-35, with an amine of the general Formula III

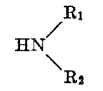   III wherein $R_1$ and $R_2$ have the meanings given in Formula I, the reaction being performed in the presence of a proton acceptor.

This reaction is optionally performed in the presence of a solvent which is inert to the reaction partners such as an aliphatic and aromatic hydrocarbon, halogenated derivatives thereof, an ether, ketone or amide. Proton acceptors are, particularly, organic bases such as tertiary amines, e.g. pyridine, trialkylamines and dialkylanilines or inorganic bases such as alkali and alkaline earth hydroxides and oxides.

If desired, the amino azacycloalkanones of the general Formula I produced by the process described above can be converted into their salts by reaction with organic or inorganic acids.

The new amino azacycloalkanones of general Formula I are compounds which are stable in water and dissolve well in the usual organic solvents.

By the alkylene radical symbolised by A in general Formula I, a radical having 4–14 carbon atoms is to be understood, of which 4 to 6 can be ring members. Such a radical is, for example, the n-butylene, n-pentylene or n-hexylene, radical which can be substituted by straight or branched chained alkyl radicals having from 1 to 10, and preferably from 1 to 8 carbon atoms.

In the general Formulae I and III, the symbol $R_1$ represents an optionally substituted aliphatic radical, particularly a saturated one having 5–18 carbon atoms. Such aliphatic radicals can be straight or branched chained alkyl or alkenyl radicals. Halogen such as fluorine, chlorine or bromine and the following groups are possible substituents: the amino, hydroxyl, cyano or thiocyano group, an alkylamino, dialkylamino, alkoxy group. Aliphatic nitrogen substituents corresponding to $R_1$ can also contain aromatic radicals, particularly an optionally substituted—as defined below—phenyl radical. As optionally substituted aromatic radical, $R_1$ represents in particular the phenyl radical, or a substituted phenyl radical which can be mono- or poly-substituted by halogen, nitro, amino, hydroxyl, cyano or thiocyano alkyl, halogenoalkyl, alkoxy, alkylamino or dialkylamino groups.

Cycloaliphatic radicals represented by $R_1$ in general Formula I are preferably the cyclopentyl, cyclohexyl, cycloheptyl radical.

$R_2$ in general Formula I stands for a low alkyl radical having 1 to 6, and preferably 1 to 4, carbon atoms such as the methyl, ethyl, propyl, isopropyl, n-butyl, sec. butyl, isobutyl or tert. butyl radical.

The new active ingredients of general Formula I and their agriculturally acceptable salts with acids are active against numerous phytopathogenic fungi. They are made up, optionally in the form of their salts, into fungicides which are suitable for the protection of plants and parts thereof such as blossom, seeds, fruit, roots, stalks and foliage, from attack by fungi. The new active substances are also systemic fungicides. Because of this property, plants treated with the active substances according to the invention are given an additional and more long lasting protection from attack by fungi. The new amino azacycloalkanones are not phytotoxic in the usual concentrations for use of 0.01 to 2% active ingredient.

The new fungicides of general Formula I in the form of so-called seed dressings give seeds treated therewith a good protection, particularly from attack by *Tilletia tritici* and *Fusarium culmorum*. There is no inhibition of germination of the seeds treated.

In addition to the excellent fungicidal activity, the amino azacycloalkanones of the general Formula I also have marked fungistatic properties so that they can be used for the combatting of fungi on materials of all types alone or combined with other substances suitable for the protection of material.

The following examples serve to illustrate the invention. Where not otherwise given, "parts" are to be understood as parts by weight; the temperatures are given in degrees centigrade.

EXAMPLE 1

14.7 parts of 3-choloro-azacycloheptan-2-one and 20.2 parts of n-hexylamine are heated for 14 hours at 120°. 2 N sodium hydroxide solution is added to the reaction mixture while cooling until there is an alkaline reaction after which the mixture is extracted with ether several times. The combined ether extracts are washed with water. The ether is distilled off and the residue is distilled fractionally. The 3-n-hexylamino-azacycloheptan - 2 - one boils at 128–132°/0.01 torr. In the spore germination test given below, the new substance has a good fungicidal action and can be made up into fungicidal dusts, dressings and sprays by the prescriptions given after the test described.

EXAMPLE 2

19.2 parts of 3-bromoazacycloheptan-2-one and 25.8 parts of octylamine are refluxed for 14 hours in 200 parts by volume of dioxan. The solvent is distilled off in vacuo and 150 parts by volume of 10% hydrochloric acid are added to the residue while stirring well. After standing for a short time at 0°, the hydrochloride of 3-octylamino-azacycloheptan-2-one crystallises out. It is recrystallised from methanol/acetone (1:2) and melts at 241–243°. The hydrochloride is suspended in a little water and 2 N sodium hydroxide solution is added until there is an alkaline reaction. The reaction mixture is extracted several times with ether, the combined ether extracts are washed with water and then dried. The solvent is distilled off and the residue is fractionated in vacuo. The 3-octyl-amino-azacycloheptan-2-one boils at 130–132°/0.01 torr. In the spore germination test described below it shows good fungicidal action and can be made up into fungicidal agents by the prescriptions given below.

EXAMPLE 3

14.8 parts of 3-chloro-azacycloheptan-2-one, 18.5 parts of laurylamine and 14.6 parts of dimethyl aniline are heated for 14 hours at 130–140°. Water and 2 N sodium hydroxide solution are added to the reaction mixture until it has an alkaline reaction. The alkaline reaction solution is extracted with ether, the ether solution is washed with water and dried. The solvent is distilled off and the residue is fractionated in vacuo. The 3-laurylamino-azacycloheptan-2-one boils at 170–180°/0.01 torr and then crystallises. After recrystallisation from acetone it melts at 54–56°. The fungicidal action of the substance can be seen from the spore germination test.

The compounds summarised in the following table can be produced in the way described in Examples 1–3 on using equivalent amounts of the corresponding starting materials:

| Reaction product | Boiling point (B.P.) or melting point (M.P.) of the base | Melting point (M.P.) of salt |
| --- | --- | --- |
| 3-n-decylamino-azacycloheptan-2-one. | M.P. 151–153° | |
| 3-myristyl-amino-azacycloheptan-2-one. | B.P. 180°/0.0001 Torr | HCl M.P. 250–253° (decomposition). |
| 3-benzylamino-azacycloheptan-2-one. | M.P. 76–77° | |
| 3-methyl-octylamino-azacycloheptan-2-one. | B.P. 140°/0.0001 Torr. M.P. 62–64°. | |
| 3-methyl-lauryl-amino-azacycloheptan-2-one. | M.P. 71–73° | |
| 3-[β-(N-methyl-N-n-hexyl-amino)-ethyl]-amino-azacycloheptan-2-one. | B.P. 175–180°/0.01 Torr. | |
| 3-[β-(N-methyl-N-n-hexylamino)-ethyl]-azacycloheptan-2-one. | | |
| 3-n-pentylamino-azacycloheptan-2-one. | | |
| 3-n-octadecylamino-azacycloheptan-2-one. | | |
| 3-n-allylamino-azacycloheptan-2-one. | | |
| 3-n-oleylamino-azacycloheptan-2-one. | | |
| 3-n-decenylamino-azacycloheptan-2-one. | | |

Reaction product

3-[β-(n-butoxy)-ethylamino]-azacycloheptan-2-one
3-phenylamino-azacycloheptan-2-one
3-(4′-chlorophenylamino)-azacycloheptan-2-one
3-phenethylamino-azacycloheptan-2-one
3-cyclohexylamino-azacycloheptan-2-one
3-octylamino-5-tert.-butyl-azacycloheptan-2-one
3-n-dodecylamino-5-tert.-butyl-azacycloheptan-2-one
3-n-octylamino-5-amyl-azacycloheptan-2-one
3-n-N-octyl-N-methyl-amino-5-nonyl-azacycloheptan-2-one
3-n-octylamino-azacyclo-nonan-2-one
3-n-myristylamino-azacyclo-octan-2-one
3-[ω-(N,N-di-methyl-amino)-hexyl]-amino-azacycloheptan-2-one.

Spore germination test

The fungicidal activity of the active ingredients of the general Formula I was determined by a spore germination test with spores of the following types of fungi: *Alternaria tenuis, Botrytis cinerea, Clasterosporium c., Coniothyrium dipl., Fusarium culmorum,* and *Mucor spec.*

1 ccm. of a 1%, 0.1% and 0.01% acetone solution of the active ingredient is placed on 2 glass slides (26 x 76 mm.) under the same conditions. The solvent is evaporated off and a uniform coating of active ingredient is obtained on the glass slides. The slides inoculated with fungi spores are then kept in dishes at room temperature in an atmosphere which is almost saturated with steam. After 2–3 and 4–6 days, the germinated spores are counted.

The concentrations of active ingredient are given in the following table which inhibit at least 90% germination.

+ in the following table shows an at least 90% inhibition of germination effected by the residue of 1 ccm. of a 1% acetone solution of active ingredient, ++ shows the same effect attained by the residue of 1 ccm. of a 0.1% acetone solution of the active ingredient, and o represents no inhibition of germination.

TABLE

| Active ingredient | Alt. ten. | Bot. cin. | Clas. c. | Conio. dipl. | Fus. culm. | Muc. spec. |
| --- | --- | --- | --- | --- | --- | --- |
| 3-(n-hexylamino)-azacycloheptan-2-one | + | + | + | + | + | + |
| 3-(n-octylamino)-azacycloheptan-2-one | + | + | + | + | + | + |
| 3-(decylamino)-azacycloheptan-2-one | + | + | + | + | + | + |
| 3-(dodecylamino)-azacycloheptan-2-one | + | + | ++ | + | + | + |
| 3-amino-azacycloheptan-2-one | o | o | o | o | o | o |

The fungicidal agents are produced by methods known per se by intimately mixing and milling the active substances of general Formula I, and their agriculturally acceptable salts formed with an acid, with suitable carriers optionally with the addition of adhesives, dispersing agents or solvents, which carriers are inert to the active substances and are agriculturally acceptable. These agents can be used in the following forms:

Solid forms: dusts, sprinkling agents, granulates (coated granules, impregnated granules, homogeneous granules), Water dispersible concentrates of active substances: wettable powders, pastes, emulsions, Liquid forms: solutions, and Forms for the production of aerosols, fogs and fumigants.

To produce the solid forms for use (dusts and sprinkling agents, granulates), the active substances are brought on to solid carriers such as talcum, kaolin, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, milled plastics, fertilisers such as ammonium sulphate, ammonium phosphates, ammonium nitrates, urea etc., and also ground nutshells, cellulose powder, residues of plant extractions, active charcoal, etc. These carriers can be used alone or admixed with each other.

The particle size of the carriers is, for dusts up to about 100μ, for sprinkling agents from about 75μ–0.2 mm. and for granulates from 0.2 mm.–1 mm. (and coarser).

As a general rule, the concentrations of active substances in the solid preparations is from 0.5–80%.

To these mixtures can also be added additives which stabilise the active substance and/or non-ionic, anionic and cationic surface active substances which, for example, improve the adhesion of the active substances on parts of plants (glues, adhesives) and/or attain better wettability (wetting agents) and dispersibility of the active substances. Examples of such surface active substances are as follows: olein plus hydrate of lime, cellulose derivatives suitable for the preparation of aqueous solutions of a medium degree of viscosity (methyl celluloses, carboxymethyl celluloses, hydroxyethyl celluloses), galactomans (guar gum), their anionic and cationic derivatives, polyethylene glycol ethers of mono- and dialkyl phenols having 5–15 ethyleneoxide radicals per molecule and 8–9 carbon atoms in the alkyl radical (the commercial products known under the names "Triton," "Igepal," "Tergitol," etc.), condensation products of ethylene oxide/propylene oxide (medium molecular weight of the polyoxypropylene part: 1750; e.g. the commercial products known by the name "Pluronics"), solid, liquid sulphite waste liquor, alkali metal and alkaline earth metal salts thereof, mineral oils and polyethylene glycol ethers (Carbowaxes), fatty alcohol polyethylene glycol ethers (having 5–20 ethylene oxide radicals per molecule and 8–18 carbon atoms in the fatty alcohol moiety; e.g. the commercial products known by the name "Genapol"), also dextrins, caseins, their calcium salts, proteins, polyvinyl pyrrolidones, polyvinyl alcohols (e.g. the commercial product known as "Moviol"), condensation products of urea-formaldehyde and also latex products, etc.

In some cases it is necessary to add to these forms for application, plant, animal and mineral oils as penetrating agents, i.e. agents which help and improve the penetration of the active substance into the plants or parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and anti-foam agents and, optionally, solvents. The concentration of active substance in these agents is 5–80%.

Wettable powders and pastes are obtained by mixing and milling the active substances with surface active substances and pulverulent carriers in suitable mixers and milling machines until homogeneity is attained. Carriers are, for example, those mentioned in the paragraph dealing with solid forms for application. In some cases it is advantageous to use mixtures of carriers. By surface active substances, glues or adhesives, wetting and dispersing agents and protective colloids are to be understood. Of the glues and adhesives already mentioned, because of their properties a number thereof can be used as so-called auxiliary dispersing agents. Other dispersing agents and wetting agents which can be used are: condensation products of naphthalene and derivatives thereof with phenol and formaldehyde (the commercial products known as "Irgatan"), also aluminium salts of lignin sulphonic acids, further alkylaryl sulphonates, alkali metal salts and alkaline earth metal salts of dibutyl naphthalene sulphonic acid, fatty alcohol sulphates such as water soluble salts of sulphated hexadecanols, heptadecanols, octadecanols, octadecenols, the sodium salt of sulphated hexadecyl glycol ethers (the commercial products known as "Eriopon"), the sodium salt of oleyl methyl tauride (the commercial products known as "Arkopon"), ditertiary acetylene glycols (the commercial products known as "Surfynol"), dialkyldilauryl ammonium chloride (the commercial product known as "Aliquat"), and fatty acid alkali metal and alkaline earth metal salts.

Examples of anti-foam agents are: silicones, Antifoam A, etc.

The active substances are so mixed, milled, sieved and strained with the additives mentioned above that the solid particle size in wettable powders and in pastes is not more than 20–40μ and 3μ respectively. To produce emulsion concentrates and pastes, liquid dispersing agents such as those given in the previous paragraphs, organic solvents and water are used. Examples of solvents are as follows: alcohols, benzene, toluene, xylenes, dimethyl sulphoxide, dimethyl formamide and mineral oil fractions boiling between 120 and 350°. The solvents must be almost without smell not phytotoxic, inert to the active substances and not easily inflammable.

The forms for application which can be dispersed in water can also contain other additives to increase the stability to light, penetrating agents, anti-foam agents and also synergists.

The wettable powders, pastes and emulsion concentrates are diluted with water to the practical concentrations desired which are between 0.01 and 2%, calculated on the active substance. In the composition and concentration for use described, these application forms have good suspendibility which can be further improved, e.g. by the addition of synthetic voluminous silicic acid. The emulsifiable property of the emulsion concentrates is also very good.

In addition, the agents according to the invention can be in the form of solutions or sprays. For this purpose an active substance of general Formula I can be dissolved in suitable organic solvents, mixtures of solvents or in water. Higher aliphatic and aromatic hydrocarbons, chlorinated derivatives thereof, alkyl naphthalenes alone or mixed with each other or with water can be used as organic solvents. The solutions contain the active substance in a concentration from 1 to 20%. They are used in the form of spray or mist with suitable spraying or mist blowing equipment.

Aerosols are produced from solutions of the active substances by the addition of propellants; aerosols are particularly suitable for use in the house and garden. Both the solutions and the aerosols can contain vegetable, animal and mineral oils to increase the adhesion and penetration and also additives to improve the resistance to rain and light.

Also, the active substances of general Formula I can be worked up with a combustible substance, e.g. sawdust or paper and a source of oxygen such as potassium chlorate and potassium nitrate, to form a fumigant or fumigant paper.

The application forms described can be mixed very well with other biocidally active compounds or agents containing such compounds. Thus, to broaden the range of action, other fungicides, also insecticides, bactericides, fungistatics, bacteriostatics or nematicides can be present together with the active substances of general Formula I. The active substances of general Formula I can also be used with fertilizers, plant hormones, etc.

The following examples describe the production of various ready-for-use forms for application containing the active substances of general Formula I. Parts are given therein as parts by weight.

Dust components (a) Parts 3-dodecylamino-azacycloheptan-2-one _____ 10
Silicic acid (highly dispersed) _____ 5
Talcum _____ 85

Dust components—Continued (b) Parts 3-tetradecylamino-azacycloheptan-2-one hydrochloride _____ 2
Silicic acid (highly dispersed) _____ 1
Talcum _____ 97

The active substances are intimately mixed and milled with the carriers. With components (a) a 10% and with components (b) a 2% dust is obtained which can be used for the treatment of seed beds or the dusting of plants.

Dressing

To produce a 10% pulverulent dressing, the following components are used:

(a) Parts 3-n-butylamino-azacycloheptan-2-one hydrochloride _ 10
Kieselguhr _____ 5
Liquid paraffin _____ 1
Talcum _____ 84

To produce a 60% pulverulent dressing, the following components are used:

(b) Parts 3-dodecylamino-azacycloheptan-2-one _____ 60
Kieselguhr _____ 15
Liquid paraffin _____ 1
Talcum _____ 24

The active ingredient is intimately mixed in a mixer, using the paraffin as distributing agent, with the carriers and the whole is milled. The pulverulent dressings obtained serve for the treatment of seeds of all types.

Wettable powder components (a) Parts 3-octylamino-azacycloheptan-2-one _____ 50
Kieselguhr _____ 15
Cetyl polyglycol ether _____ 2
Tetramethyldecine-(5)-diol-(4,7) (Surfynol 104) __ 5
A condensation product of propylene oxide and ethylene oxide ("Pluronic F68") _____ 1.5
A condensation product of propylene oxide and ethylene oxide ("Pluronic L61") _____ 1.5
Silicone _____ 2
Kaolin _____ 23

(b)

3-methyl-dodecylamino-azacycloheptan-2-one _____ 50
Kieselguhr _____ 10
Cetyl polyglycol ether _____ 5
Kaolin _____ 35

The active ingredients are mixed with the carriers and distributing agents given and finely milled. 50% wettable powders are obtained the wettability and suspendability of which are excellent.

On diluting these wettable powders with water, suspensions are produced which are suitable for the treatment of fruit trees.

Granulate components (a) Parts

One of the 50% wettable powders given above under (a) or (b) _____ 4
Carbowax _____ 3.5
Ground limestone _____ 92
Silicic acid (highly dispersed) _____ 0.5

(b)

3-decylamino-azacycloheptan-2-one _____ 2
Carbowax _____ 2
Ground limestone _____ 95.5
Silicic acid (highly dispersed) _____ .5

The ground limestone is evenly impregnated with the Carbowax. This is then mixed with the mixture consisting of active ingredient or the wettable powder and the highly dispersed silicic acid.

These granulates are excellently suitable for the disinfection of seed beds.

Paste components

Parts

3-β-phenylethylamino-azacycloheptan-2-one _____ 50
Nonylphenol/ethylene oxide condensation product (having 8–10 ethylene oxide groups per molecule)_ 14
Spindle oil _____ 3.5
Soap powder _____ .5
Water _____ 32

The active substance is intimately mixed and milled with the additives in a mixer. A 50% paste is obtained which, before use as fungicide, can be diluted with water to any concentration desired.

Emulsion concentrate components

Parts 3-dodecyl-azacyclopentan-2-one _____ 10
Xylene _____ 55
Dimethyl formamide _____ 32
Emulsifying mixture: alkylaryl polyethylene glycol/ alkylaryl sulphonate/potassium salt _____ 3

The active substance is dissolved in the mixture of xylene and dimethyl formamide. This solution is then added to the emulsifying mixture. A 10% emulsifiable solution is obtained which can be diluted with water to form emulsions of any concentration desired.

I claim:
1. A compound of the formula

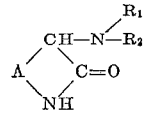

wherein $R_1$ represents alkyl of from 5–18 carbon atoms, alkenyl of from 3 to 18 carbon atoms, cyclohexyl, phenyl-low alkyl, phenyl, chlorophenyl, bromo-phenyl, N-alkyl-substituted amino-lower alkyl wherein the lower alkyl moiety has from 2 to 6 carbon atoms and the alkylamino moiety thereof from 1 to 12 carbon atoms, $R_2$ represents hydrogen or lower alkyl, A represents alkylene of from 4 to 14 carbon atoms of which from 4 to 6 are ring members.
2. 3-n-hexylamino-azacycloheptan-2-one.
3. 3-octylamino-azacycloheptan-2-one.
4. 3-laurylamino-azacycloheptan-2-one.
5. 3-myristyl-amino-azacycloheptan-2-one.
6. 3-octylamino-5-tert. butyl-azacycloheptan-2-one.
7. 3 - n - dodecylamino-5-tert. butyl-azacycloheptan-2-one.
8. 3-allylamino-azacycloheptan-2-one.
9. 3-octylamino-azacycloheptan-2-one hydrochloride.
10. 3 - myristylamino-azacycloheptan-2-one hydrochloride.
11. 3-dodecylamino-azacycloheptan-2-one.
12. 3 - n-butylamino-azacycloheptan-2-one hydrochloride.
13. 3-methyl-dodecylamino-azacycloheptan-2-one.
14. 3-decylamino-azacyloheptan-2-one.
15. 3-β-phenylethylamino-azacycloheptan-2-one.

References Cited

UNITED STATES PATENTS 3,105,067  9/1963  Nelemans et al. ____ 260—239.3
3,121,741  2/1964  Brenner et al. _____ 260—239.3
3,275,619  9/1966  Brenner et al. _____ 260—239.3

HENRY R. JILES, Primary Examiner.

ROBERT T. BOND, Assistant Examiner.

U.S. Cl. X.R.

167—33